United States Patent [19]
Chen

[11] 3,967,106
[45] June 29, 1976

[54] DEVICE FOR ENABLING A FIXED SENSOR OF AN AUTOMATIC ELECTRONIC FLASH UNIT TO RESPOND TO BOUNCED LIGHT

[76] Inventor: Tung Chang Chen, 138 Wooded Lane, Villanova, Pa. 19085

[22] Filed: May 15, 1975

[21] Appl. No.: 577,676

[52] U.S. Cl. .................... 240/1.3; 354/32; 354/35; 354/128
[51] Int. Cl.² .......................... G03B 15/02
[58] Field of Search ........... 240/1.3; 354/32, 33, 354/35, 127, 128

[56] References Cited
UNITED STATES PATENTS
3,258,586  6/1966  Blizzard ....................... 240/1.3

*Primary Examiner*—Monroe H. Hayes
*Attorney, Agent, or Firm*—William E. Cleaver

[57] ABSTRACT

The present device comprises a mirror means rotatably mounted on a flash unit whereby the mirror lies in a partially rotatable marquee posture, protruding from the front side of an automatic electronic flash unit, over the sensor unit. The mirror housing can be rotated in response to the flash unit being rotated so that light which has been bounced from one or more surfaces, before reflecting from the subject to be photographed, is reflected from the mirror surface to the sensor unit for the purpose of controlling the duration of the flash to effect a proper exposure of the film.

5 Claims, 4 Drawing Figures

DEVICE FOR ENABLING A FIXED SENSOR OF AN AUTOMATIC ELECTRONIC FLASH UNIT TO RESPOND TO BOUNCED LIGHT

BACKGROUND

Generally, an automatic electronic flash unit, which is employed by a photographer, has a flash lamp as well as a light sensor. The light sensor acts to detect the light reflected from the subject to be photographed and in response to said reflected light controls the duration of the flash so that a proper exposure of the film is obtained. Such an automatic electronic flash unit is very often not effective when operating in a bounced light mode; i.e., the mode of operation where the light flash is aimed at a reflecting surface, such as a ceiling in a room or a wall in a room, because the sensor of such a unit is aimed in the same direction as the light flashes and therefore said sensor is not properly oriented to receive light which has been reflected from the subject being photographed. In such circumstances, since the light, if any, which is detected by the sensor is not light which is reflected from the subject to be photographed, the flash duration is not properly controlled and incorrect film exposure is the normal result.

Now it should be understood that certain automatic electronic flash units, which are generally considered to be expensive, do have the facility of positioning the source of light flash independently of the light sensor. It should be apparent that with this last described structure, the sensor can be aimed at the subject to be photographed while at the same time the source of the light flash can be aimed at a reflecting surface. With this arrangement the light sensor does operate properly to control the duration of the flash and it is not to this type of device that the present invention is directed.

The present invention is directed to a device which is attached to an automatic flash unit or which can be attached to an automatic flash unit and which is relatively fixed with respect to the flash unit. The present invention enables such a unit to be operated in a bounced light mode.

The objects and features of the present invention will be better understood in connection with the following description when taken in conjunction with the drawings in which.

Figure 1:
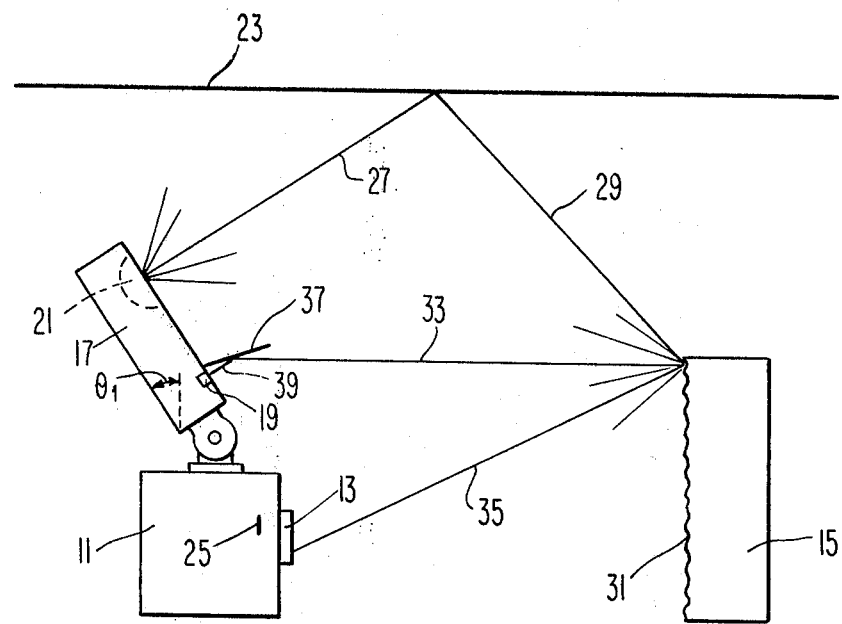
FIG. 1 is a pictorial schematic of a flash unit, including the present invention, employed in a bounced light mode of operation.

Consider FIG. 1 which provides an overall view of the utility of the present invention. In FIG. 1, there is shown a camera 11 which includes a lens housing 13 wherein there is located a lens (not shown). The camera lens is aimed at the subject 15, which is the subject to be photographed. Attached to the camera 11 is an automatic electronic flash unit 17, hereinafter referred to as flasher 17. The flasher 17 includes a sensor element 19. The sensor element 19 is a photocell device which is responsive to impinging light to generate an electric signal. In such devices, the electric signal returns to control circuitry which controls the duration of the flash which is emanating from lamp 21. The length of the flash, or the length of time that light is present to fully illuminate the subject provides a basis for determining a proper exposure of the film in camera 11 and accordingly provides an improved picture. Such automatic electronic flash units are well known, an example of such being an Auto/Strobonar, manufactured by Honeywell, Inc.

In the arrangement depicted in FIG. 1, the flasher 17 is tilted backward so that the lamp 21 faces the ceiling. When the lever 25 of camera 11 is moved, the lamp 21 flashes (and the lens opens). Lamp 21 can be considered a multi-directional light source as indicated by the plurality of rays emanating therefrom. One of these rays, ray 27, is shown leaving lamp 21 and bumping into the ceiling 23. The ceiling 23 can be considered to be a reflective surface so that light ray 27 reflects from ceiling 23 to provide reflected ray 29. The angle of incidence equals the angle of reflection so that reflected ray 29 is directed to the subject 15 as shown. Now it should be understood that there would be a plurality of light rays bouncing, or reflecting, from ceiling 23 and accordingly the surface 31 is entirely lighted.

The surface 31 of subject 15 is a relatively irregular surface, such as a human body, and hence the light is not sharply reflected but is scattered in a wide angle. Accordingly, one ray of light 33 is directed toward the flasher 17 while a second ray of light 35 is directed toward the lens holder 13. It should be understood that there is a plurality of rays emanating from each location of surface 31 which is struck by the light rays from the ceiling 23.

The technique of bounced light illumination of a subject being photographed is well known in the photography art and it is accepted that a picture which is produced with a bounced light illumination is a relatively "soft" picture, with a minimum of shadows involved. In employing a bounced light technique, with the use of a fixed sensor, the problem has been that the sensor has not been the proper target for light reflecting from or emanating from the subject.

Figure 2:
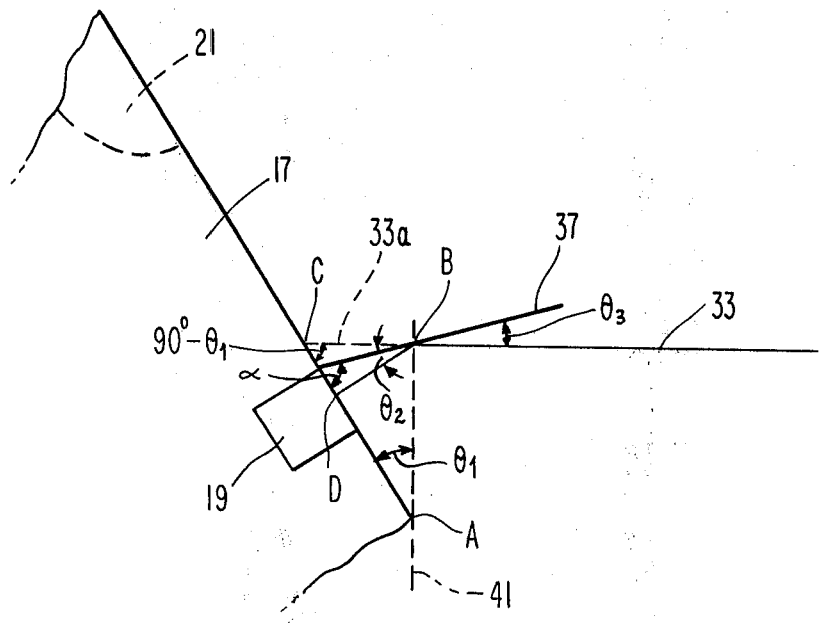
FIG. 2 is an enlarged view of a section of FIG. 1.

If we examine FIG. 2 in connection with the study of FIG. 1, the difficulty with the prior art and the solution by the present invention become apparent.

We have examined FIG. 1 up to the point where light rays 33 and 35 have been identified. Light ray 33, as is apparent in FIGS. 1 and 2, travels in a straight line until it strikes the mirror 37. Mirror 37 is shown unsupported in FIG. 2 in order to simplify the drawing so that the role of the light rays might be better studied. It is apparent from FIG. 2 that if the mirror 37 did not intercept the light ray 33, it would continue its travel, as depicted by dashed line 33a, to strike the flasher 17, but not at the sensor 19 position. However, with the invention present, light ray 33 reflects from mirror 37 and the mirror reflected light ray 39 enters the sensor 19 to provide a strong effect on the photo-electric cell therein, thus producing a control signal. Said control signal acts to control the duration of the flash from the lamp 21. The mirror 37 should be located at a suitable angle to effect the best reflection into the sensor 19.

The relationship of the angle $\theta_1$ of tilt of the flasher 17 to the angle $\alpha$, the angle position of the mirror 37, can be understood as follows. Let us assume that the axis of the lens holder 13 lies truly horizontal or orthogonal to the subject 15, and that the dashed line 41 is perpendicular to the axis line of the lens holder 13. In effect, line 41 is parallel to the face of the camera housing or the surface of the film plane. Accordingly the angle $\theta_1$ is the angle to which the flasher 17 is tilted from the vertical line 41. In the preferred arrangement, light striking the sensor 19 should be perpendicular to the surface of the sensor. In order for light, passing from the subject 15 into the sensor 19, to be perpendicular to sensor 19 the angle $\theta_2$ becomes established for an angle $\alpha$. But $\theta_2$ must equal $\theta_3$ since the angle of incidence must equal the angle of reflection. If we examine the two triangles ABC and BCD, we find the following relationships. Angle BCA must be equal to $90° - \theta_1$ because angle ABC is a right angle. Therefore angle DBC must be equal to $\theta_1$ because angle CDB is a right angle. However, by observation angle DBC = $\theta_1$ and is equal to $\theta_2 + \theta_3$. Since $\theta_2 = \theta_3$, $\theta_2$ and $\theta_3$ must each be equal to ½ $\theta_1$. It follows then that angle $\alpha$, the angle position of the mirror must be equal to $90° - \theta_2$ or $90° - \frac{1}{2}\theta_1$. Since we can determine $\theta_1$ when we tilt the flasher 17 we can determine angle $\alpha$. It should be understood that the foregoing relationship will effectively direct the axis of the sensor at the subject while the flasher 17 is directed to other directions. In doing so, the sensor will measure the reflected light from the subject in the same direction at which the camera is aimed.

As was suggested above, the mirror 37 is shown in FIGS. 1 and 2 without support. It should be understood that the mirror is supported in position angle $\alpha$ with respect to the front surface of the flasher 17.

Figure 3:
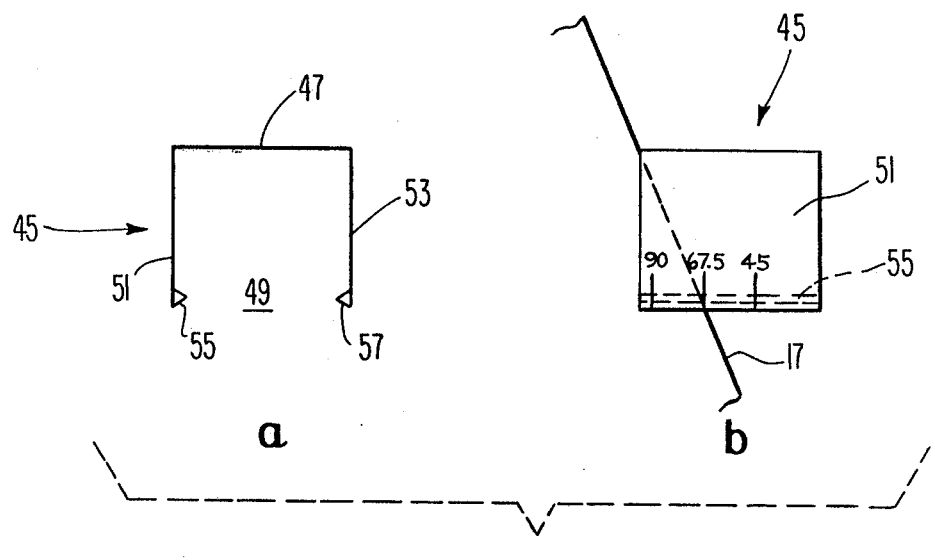
FIGS. 3a and 3b show one form of housing which can be used to hold the sensor mirror.

If we examine FIGS. 3a and 3b, we find an adjustable housing means for the reflecting surface or mirror. In FIG. 3a there is shown the front view of a three-sided mirror holder 45. The reflecting surface or mirror 47 is disposed to reflect downward into the opening 49 of holder 45. The holder 45 is preferably fabricated from spring metal which tends to force the sides 51 and 53 toward one another. Side 51 has a sharp ridge 55 formed therein while side 53 has a sharp ridge 57 formed therein. The holder 45 fits over the edge of the flasher 17 as depicted in FIG. 3b. The ridges 55 and 57 grip into the sides of the flasher to secure the holder at the proper angle $\alpha$. In FIG. 3b the holder 45 is shown secured in angle $\alpha$ equal to 67.5°. In accordance with the above discussion this arrangement would take place when $\theta_1 = 45°$.

While I have suggested that a mirror can be secured to the upper part of holder 45 to provide a reflecting surface 47, it should be understood that a front surface glass mirror or a polished surface of stainless steel or chrome plated surface or the like will provide a good reflecting surface. It should also be apparent that the angle can be changed by merely spreading the sides of the holder 45, relocating the holder to a new angle $\alpha$ and permitting the spring forces of the holder 45 to act to have the ridges 55 and 57 grip the flasher 17.

Figure 4:
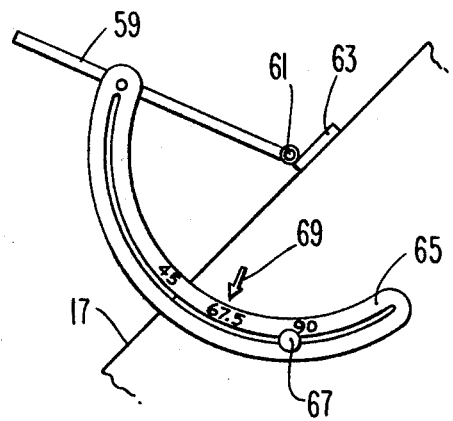
FIG. 4 shows a second means to locate a mirror in proximity to the sensor.

FIG. 4 shows a second embodiment of a mirror arrangement. In FIG. 4 the mirror 59 is hinged by hinge 61 and secured to flasher 17 by the hinge plate 63. An adjustment rack 65 is shown secured to the mirror 59. The rack 65 is held secure in any one of a number of positions by thumb screw 67. An arrow or marker 69 is located on the flasher 17. As the rack 65 is moved to the left the mirror 59 is raised, increasing angle $\alpha$. If rack 65 is moved to the right, angle $\alpha$ is decreased and for any number of positions, the mirror 59 is held secure. It should be understood that many other forms of support means can be employed to hold the mirror in position.

The present description has been directed to a bounced light operation wherein the light was bounced from the ceiling and this concept should not be considered as a limitation on this invention. Indeed the light can be bounced from a side wall or some other reflecting surface. In the event that the whole camera arrangement were placed into a position to permit the flash to bounce off a side wall; i.e., camera is rotated 90° about axis of lense, the mirror arrangement shown in the figures would operate to reflect the light into the sensor. On the other hand if the flash were rotated about a vertical axis the mirror could be hinged on its side to rotate into position to catch light rays reflecting from the subject. For example, if the camera were turned to the left side wall the mirror would be hinged on left side of flash unit.

I claim:
1. A device to be employed with a camera flash unit arrangement which is composed of a housing means having a flash unit and light sensor means disposed therein in fixed relationship with respect to one another, comprising in combination: light reflecting means; support means disposed in close proximity to said sensor means and secured to said light reflecting means for providing support thereto and formed to permit partial rotation thereof with respect to said housing means, said support means further formed to be movably engaged with said housing means whereby said light reflecting means can be moved and held in a plurality of positions with respect to said light sensor means whereby reflected light from said flash unit can be directed to said light sensor means.

2. A device according to claim 1 wherein said light reflecting means is a light reflecting metal member and wherein said support means are first and second resilient metal members formed integral with said light reflecting metal member.

3. A device according to claim 1 wherein said light reflecting means is a glass mirror.

4. A device according to claim 1 wherein said support means is a slideable bracket fastened to said light reflecting member and which is formed to pass over a tightening member and wherein there is included a tightening member to secure said bracket in any one of a plurality of positions.

5. A device according to claim 4 wherein said support means further includes a hinge means which has first and second connecting members and wherein said first connecting member is secured to said light reflecting means and wherein said second connecting member is secured to said housing means.

* * * * *